United States Patent
Takakura et al.

(10) Patent No.: US 12,505,764 B2
(45) Date of Patent: Dec. 23, 2025

(54) DECORATIVE SHEET, AND DECORATIVE-SHEET-INCLUDED DISPLAY DEVICE

(71) Applicant: DAI NIPPON PRINTING CO., LTD., Tokyo-to (JP)

(72) Inventors: Tsubasa Takakura, Tokyo-to (JP); Kenichi Yamauchi, Tokyo-to (JP); Naoto Yamanaka, Tokyo-to (JP); Masato Mizuochi, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 817 days.

(21) Appl. No.: 17/598,325

(22) PCT Filed: Mar. 27, 2020

(86) PCT No.: PCT/JP2020/014418
§ 371 (c)(1),
(2) Date: Sep. 27, 2021

(87) PCT Pub. No.: WO2020/196906
PCT Pub. Date: Oct. 1, 2020

(65) Prior Publication Data
US 2022/0189352 A1    Jun. 16, 2022

(30) Foreign Application Priority Data
Mar. 28, 2019 (JP) .................... 2019-064710

(51) Int. Cl.
*G09F 13/08* (2006.01)
*B23K 26/40* (2014.01)
(Continued)

(52) U.S. Cl.
CPC .............. *G09F 13/08* (2013.01); *B23K 26/40* (2013.01); *B23K 26/57* (2015.10); *B23K 2101/18* (2018.08)

(58) Field of Classification Search
CPC .... B23K 26/40; B23K 26/57; B23K 2101/18; G09F 13/08; G09F 13/04; G09F 9/30; G02B 5/206; G02B 1/111
See application file for complete search history.

(56) References Cited

U.S. PATENT DOCUMENTS

2021/0178733 A1* 6/2021 Yamanaka ............ B32B 27/325

FOREIGN PATENT DOCUMENTS

| JP | H03-287427 A | 12/1991 |
|----|---|---|
| JP | 2000-305495 A | 11/2000 |

(Continued)

OTHER PUBLICATIONS

Oct. 14, 2022 Office Action issued in Japanese Patent Applcaition No. 2021-214080.

(Continued)

*Primary Examiner* — Wael M Fahmy
*Assistant Examiner* — Tiberiu Dan Onuta
(74) *Attorney, Agent, or Firm* — Oliff PLC

(57) ABSTRACT

A method of manufacturing a decorative sheet includes a step of stacking a light-shielding film and a design film on a surface of a base material film and a step of removing a part of the light-shielding film and a part of the design film by radiating laser light from positions on the base material film and forming transparent portions. The design film the part of which is removed forms a design layer that displays design. The light-shielding film the part of which is removed forms a light-shielding layer that covers the design layer.

3 Claims, 8 Drawing Sheets

(51) Int. Cl.
*B23K 26/57* (2014.01)
*B23K 101/18* (2006.01)

(56) References Cited

FOREIGN PATENT DOCUMENTS

| JP | 2001-331132 | A | | 11/2001 | | |
| JP | 2005037818 | A | * | 2/2005 | ............ | G09F 13/00 |
| JP | 2015-189179 | A | | 11/2015 | | |
| JP | 2017-072664 | A | | 4/2017 | | |
| JP | 2018-163341 | A | | 10/2018 | | |
| JP | 2018163344 | A | * | 10/2018 | ............ | G02B 5/00 |
| JP | 2018-173556 | A | | 11/2018 | | |
| JP | 2021026074 | A | * | 2/2021 | ............ | B32B 27/00 |
| JP | 2022-058454 | A | | 4/2022 | | |
| WO | 2019/044847 | A1 | | 3/2019 | | |

OTHER PUBLICATIONS

Jul. 2, 2024 Office Action issued in Japanese Patent Application No. 2023-065184.
Jun. 23, 2020 International Search Report issued in International Patent Application No. PCT/JP2020/014418.
May 21, 2021 Office Action issued in Japanese Patent Application No. 2021-507727.
Sep. 28, 2021 International Preliminary Report on Patentability issued in International Patent Application No. PCT/JP2020/014418.
Dec. 6, 2022 Office Action issued in Japanese Patent Application No. 2021-214080.
Oct. 5, 2021 Office Action issued in Japanese Patent Application No. 2021-507727.

* cited by examiner

DECORATIVE SHEET, AND DECORATIVE-SHEET-INCLUDED DISPLAY DEVICE

TECHNICAL FIELD

The present invention relates to a method of manufacturing a decorative sheet, a decorative sheet, and a decorative-sheet-including display device.

BACKGROUND ART

As disclosed in, for example, JP2001-331132A, a known display device displays image light. The display device is normally observed in black when the display device displays no image. Design properties are very important for surface members of, for example, an automobile, furniture, and a building material for housing. Currently, not only display devices that are used in various fields are expected to have a function of merely displaying an image, but also the design properties are required to harmonize with surrounding environment.

It is thought that a decorative sheet is disposed so as to face the display surface of a display device to provide the design properties to the display device. The decorative sheet enables the design properties that can harmonize with the surrounding environment of the display device to be provided. Specifically, the decorative sheet can have the design properties in a manner in which the decorative sheet includes a design layer for producing design. Transparent portions such as holes are formed in a region that faces the display surface of the decorative sheet such that image light of the display device can pass through the decorative sheet.

The transparent portions of the decorative sheet are formed by removing parts of a design film that is to form the design layer by using laser light. In other words, the transparent portions correspond to opening portions that are formed by the laser light. In some cases where the design film is removed by the laser light, and the transparent portions are formed, the design film cannot be sufficiently removed at one of the transparent portions, and a residue of the design film that is not removed remains in the transparent portion. The design properties can differ between the transparent portion in which the residue remains and a transparent portion in which no residue remains. The difference in the design properties causes the design properties that are provided by the decorative sheet to be degraded.

SUMMARY OF INVENTION

The present invention has been accomplished in view of these circumstances, and it is an object of the present invention to make a residue unlikely to remain in a transparent portion of a decorative sheet and to inhibit the design properties of the decorative sheet from being degraded.

A method of manufacturing a decorative sheet according to the present invention includes a step of stacking a light-shielding film and a design film on one side of a base material film, and a step of removing a part of the light-shielding film and a part of the design film by radiating laser light from a side of the base material film and forming a plurality of transparent portions. The design film the part of which is removed forms a design layer that displays design, and the light-shielding film the part of which is removed forms a light-shielding layer that covers the design layer.

In the method of manufacturing a decorative sheet according to the present invention, the light-shielding film may be stacked so as to be in contact with a surface of the base material film.

In the method of manufacturing a decorative sheet according to the present invention, an absorption coefficient of the laser light in the light-shielding film may be higher than an absorption coefficient of the laser light in the design film.

In the method of manufacturing a decorative sheet according to the present invention, an absorption coefficient of the laser light in the light-shielding film may be 3 or more.

In the method of manufacturing a decorative sheet according to the present invention, the light-shielding film may be a uniform film composed of the same material.

In the method of manufacturing a decorative sheet according to the present invention, an absorption coefficient of the laser light in the light-shielding film may be uniform in the light-shielding film.

In the method of manufacturing a decorative sheet according to the present invention, the design film may contain an inorganic material.

In the method of manufacturing a decorative sheet according to the present invention, the inorganic material may have a flake shape.

In the method of manufacturing a decorative sheet according to the present invention, a maximum length of the inorganic material may be 5 µm or more.

In the method of manufacturing a decorative sheet according to the present invention, the inorganic material may contain aluminum, titanium oxide, or mica.

In the method of manufacturing a decorative sheet according to the present invention, the plurality of transparent portions may be formed so as to be gradually enlarged as a distance from the base material film increases.

In the method of manufacturing a decorative sheet according to the present invention, the plurality of transparent portions may be regularly formed in a two-dimensional array.

In the method of manufacturing a decorative sheet according to the present invention, the plurality of transparent portions may be formed such that a diameter of a largest incircle is no less than 30 µm and no more than 150 µm.

In the method of manufacturing a decorative sheet according to the present invention, the design film may have a visible light transmittance of 20% or less.

In the method of manufacturing a decorative sheet according to the present invention, the step of forming the plurality of transparent portions may include radiating the laser light with an angle between a direction of a normal to a film surface corresponding to one side of the base material film and a vertical downward direction being less than 90°.

A decorative sheet according to the present invention includes a base material film, a light-shielding layer and a design layer that are disposed on one side of the base material film, and a transparent portion at which neither the light-shielding layer nor the design layer is formed. A length of the transparent portion along a film surface of the base material film increases as a distance from the base material film increases.

In decorative sheet according to the present invention, the light-shielding layer may be disposed on the design layer opposite the base material film.

In decorative sheet according to the present invention, the design layer may be disposed on the light-shielding layer opposite the base material film.

A decorative-sheet-including display device according to the present invention includes a display device that has a display surface, and the decorative sheet that faces the display surface and that is described above. The decorative sheet is disposed such that a side provided with the light-shielding layer of the design layer faces the display surface.

According to the present invention, a residue is unlikely to remain in transparent portions of a decorative sheet, and the design properties of the decorative sheet are inhibited from being degraded.

DESCRIPTION OF EMBODIMENTS

Figure 1:
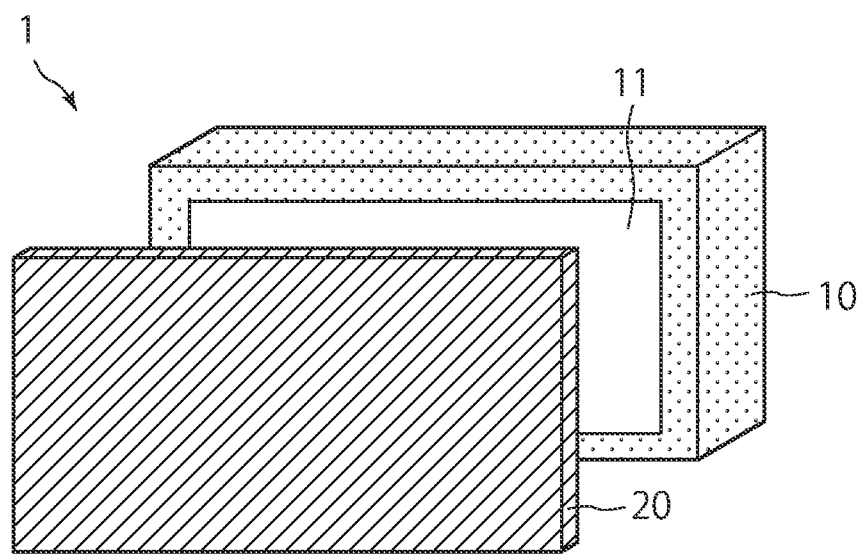
FIG. 1 is a schematic exploded perspective view of a decorative-sheet-including display device.

An embodiment of the present invention will hereinafter be described with reference to the drawings. In the drawings included to the present specification, a scale and an aspect ratio, for example, are appropriately changed from those of actual objects and are exaggerated for convenience of illustrations and ease of understanding.

In the present specification, the words "layer", "sheet", and "film" are not distinguished based on a difference in name alone. For example, the word "layer" has a concept that includes a member referred to as a sheet or a film.

A "film surface (a plate surface, or a sheet surface)" means a surface that extends in a plane direction of a film member (a plate member, or a sheet member) of interest when the film (plate or sheet) member of interest is viewed as a whole and in perspective.

The words "parallel", "perpendicular", and "same" and values of lengths and angles that are used for specifying shapes, geometrical conditions, and the degree thereof in the present specification, for example, are not limited by strict meanings and are interpreted to such an extent that the same function can be expected.

FIG. 1 is a schematic exploded perspective view of a decorative-sheet-including display device 1 that includes a decorative sheet 20 that is manufactured by a manufacturing method according to an embodiment of the present invention. As illustrated in FIG. 1, the decorative-sheet-including display device 1 includes a display device 10 that has a display surface 11 and the decorative sheet 20 that faces the display surface 11. In the decorative-sheet-including display device 1, the decorative sheet 20 is disposed such that a side provided with a light-shielding layer 27 of a design layer 30 described later faces the display surface 11 of the display device 10. In an example illustrated, the decorative-sheet-including display device 1 has a flat plate shape. However, components of the decorative-sheet-including display device 1 may curve, and consequently, the decorative-sheet-including display device 1 may have a curved shape.

The display device 10 emits image light and has the display surface 11 from which the image light can be emitted. The display device 10 may be a freely selected display device such as a liquid-crystal display, a plasma display, an organic EL display, or a LED. The display surface 11 of the display device 10 is typically a glass surface. The display device 10 may display an image in a manner in which light passes through, for example, a transparent film on which printing is performed or may display part of light, or brightness and darkness by using shading. In this case, the display device 10 includes a light source that emits light, the transparent film on which printing is performed, and the shading.

The decorative sheet 20 faces the display surface 11 of the display device 10 and covers at least the entire display surface 11 such that the display surface 11 is not directly observed from the outside. The decorative sheet 20 has dimensions equal to or larger than the dimensions of the display surface 11 so as to cover the entire display surface 11 of the display device 10. In an example illustrated in FIG. 1, the decorative sheet 20 is a member that has a flat plate shape that extends in the same direction as the display surface 11 of the display device 10 as a whole. The thickness of the decorative sheet 20 is, for example, no less than 20 µm and no more than 3 mm.

Figure 2:
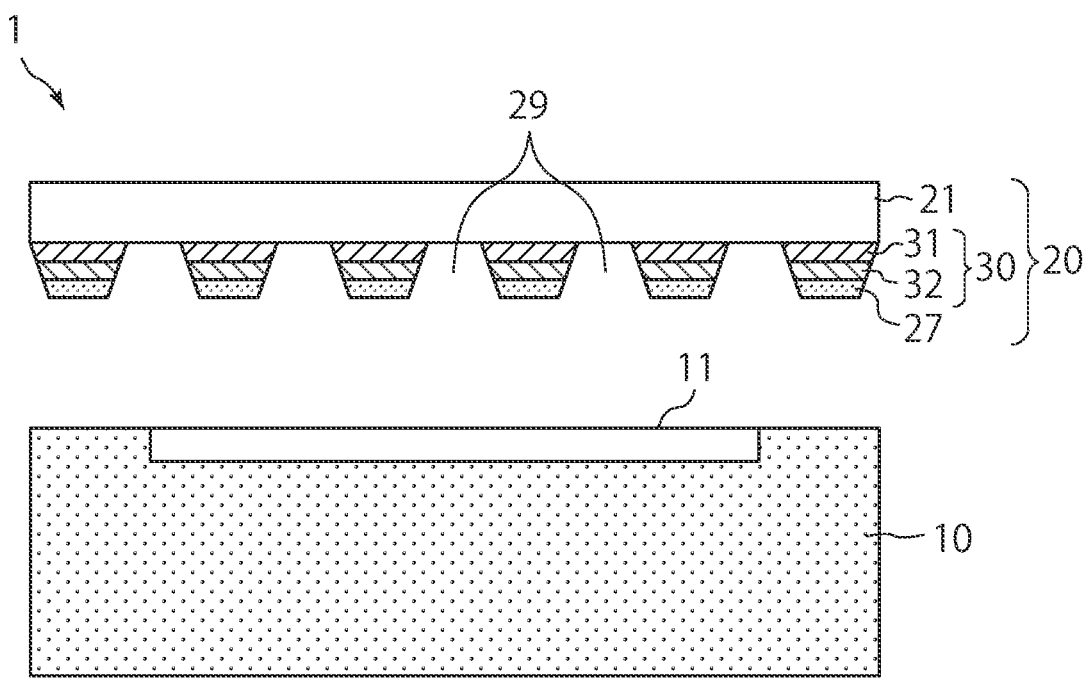
FIG. 2 illustrates an example of an exploded sectional view of the decorative-sheet-including display device in FIG. 1.
Figure 3:
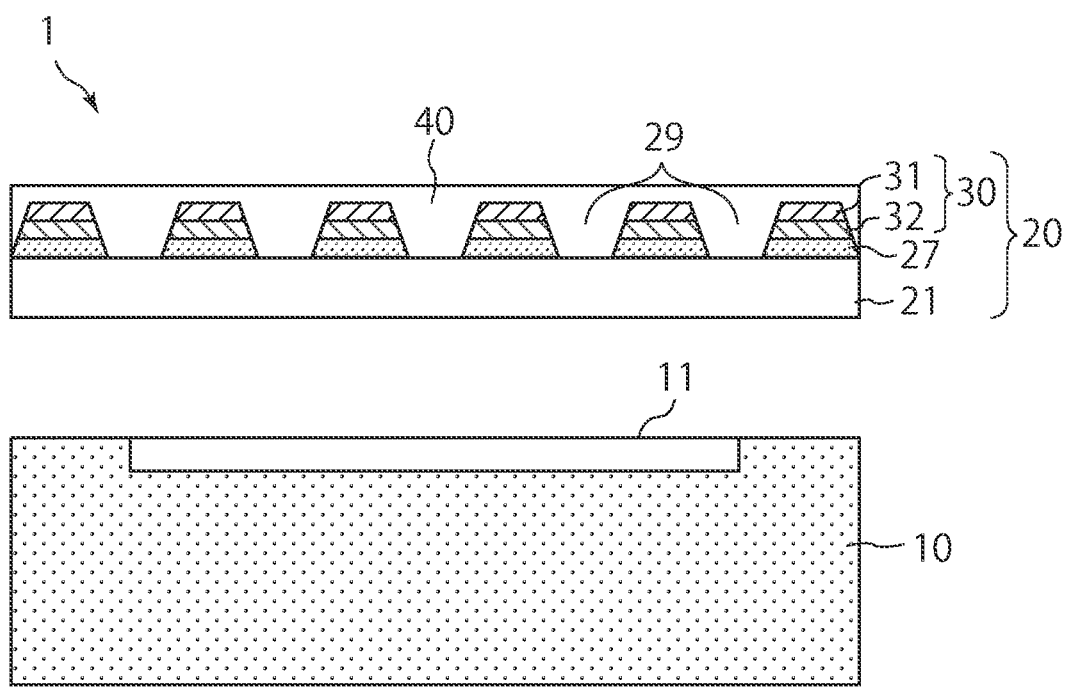
FIG. 3 illustrates another example of the exploded sectional view of the decorative-sheet-including display device in FIG. 1.

The decorative sheet 20 displays design and provides design properties to the decorative-sheet-including display device 1. The decorative sheet 20 includes a base material film 21, the light-shielding layer 27 and the design layer 30 that are disposed on one side of the base material film 21, and transparent portions 29 at which neither the design layer 30 nor the light-shielding layer 27 is formed. The decorative sheet 20 is disposed such that a side provided with the light-shielding layer 27 of the design layer 30 faces the display surface 11 of the display device 10. FIG. 2 and FIG. 3 illustrate exploded sectional views of an example and another example of the decorative sheet 20. In an example illustrated in FIG. 2, the light-shielding layer 27 is disposed on the design layer 30 opposite the base material film 21. That is, in the example illustrated in FIG. 2, the base material film 21, the design layer 30, and the light-shielding layer 27 are stacked in this order in the decorative sheet 20. In an example illustrated in FIG. 3, the design layer 30 is disposed on the light-shielding layer 27 opposite the base material film. That is, in the example illustrated in FIG. 3, the base material film 21, the light-shielding layer 27, and the design layer 30 are stacked in this order in the decorative sheet 20. While the display device 10 displays no image, the decorative sheet 20 displays design that is produced by the design layer 30. While the display device 10 displays an image, the decorative sheet 20 allows the image light from the display surface 11 of the display device 10 to pass through the transparent portions 29.

Figure 2A:
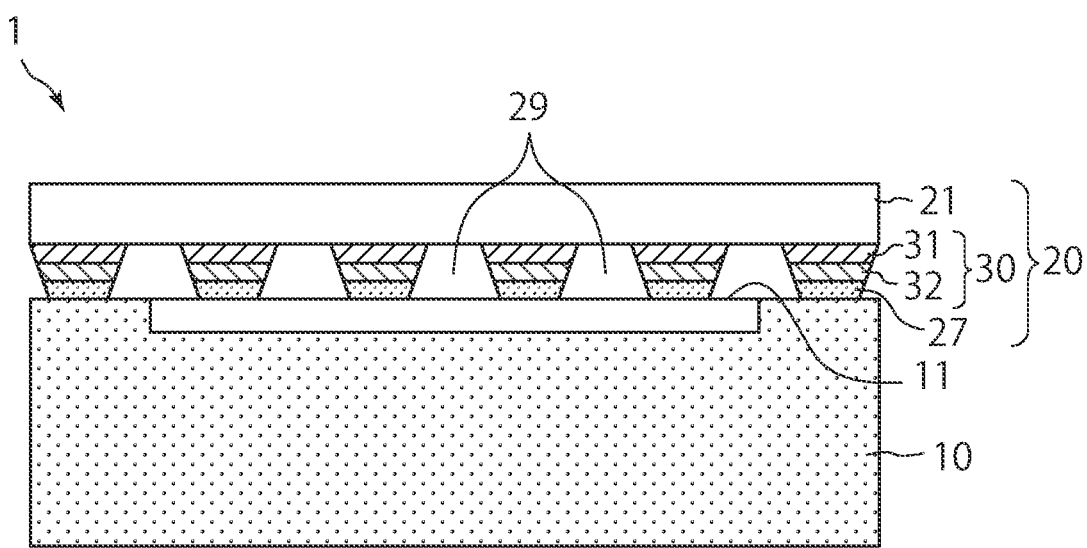
FIG. 2A illustrates another example of the sectional view of the decorative-sheet-including display device in FIG. 1.
Figure 3A:
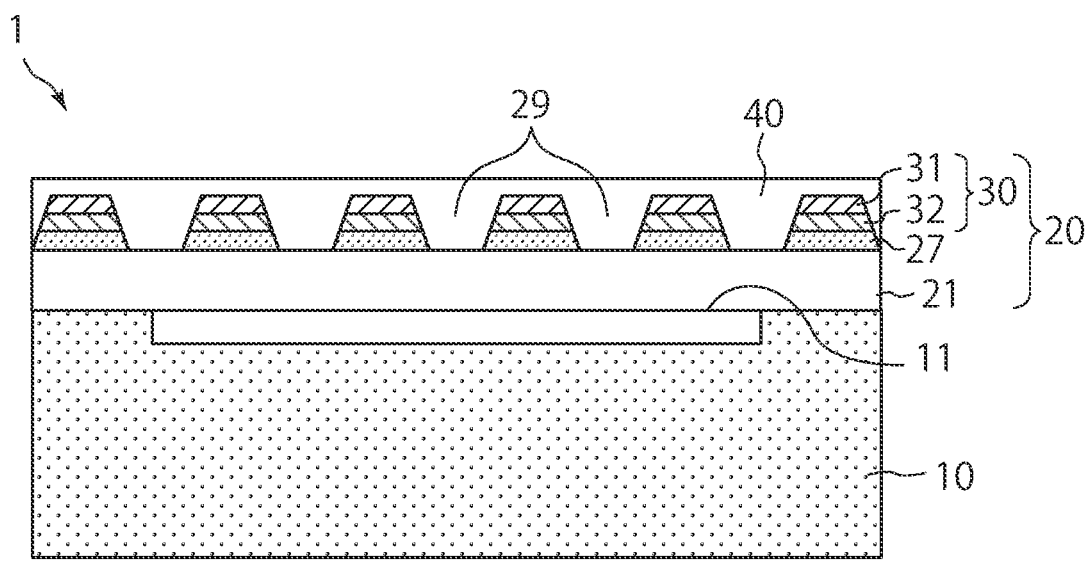
FIG. 3A illustrates another example of the sectional view of the decorative-sheet-including display device in FIG. 1.

In the examples illustrated in FIG. 2 and FIG. 3, the decorative sheet 20 and the display device 10 are illustrated as separated bodies. As illustrated in FIG. 2A and FIG. 3A, however, the decorative sheet 20 and the display device 10 may be integrated. For example, the decorative sheet 20 and the display device 10 can be integrated in a manner in which the decorative sheet 20 and the display device 10 are joined to each other by using a joining layer, not illustrated.

The base material film 21 appropriately supports the design layer 30 and the light-shielding layer 27 that are stacked on the base material film 21. The base material film 21 is a transparent film member. The base material film 21 may be any material that is transparent to visible light and that can appropriately support the design layer 30 and the light-shielding layer 27, and examples thereof can include polymethyl methacrylate, polyethylene terephthalate, polyethylene naphthalate, polycarbonate, polystyrene, cyclic polyolefin, ABS (acrylonitrile-butadiene-styrene copolymer), MABS (methyl methacrylate-acrylonitrile-butadiene-styrene copolymer) and mixed resin thereof. The base material film 21 may have a single layer or a multilayer structure in which the same kind or different kinds of films are stacked into a two or more layers. The base material film 21 preferably has a thickness of no less than 10 µm and no more than 3 mm in consideration for, for example, visible light transparency and appropriate support ability for the design layer 30 and the light-shielding layer 27.

The word "transparent" means that visible light transmittance that is measured at a measurement wavelength ranging from 380 nm to 780 nm by using a spectrophotometer ("UV-3100PC" conforming JIS K 0115 made by SHIMADZU CORPORATION) and that is specified as the average value of transmittance at wavelengths is 80% or more.

The design layer 30 produces the design that is displayed by the decorative sheet 20. The design layer 30 can produce a pictorial pattern, as the design, such as a figure, a pattern, a design, a color, a picture, a photograph, a character, a mark, a letter, or a numeral. In particular, a wood-grain-like or marble-like pictorial pattern and a geometric pattern can be taken as examples of design that can harmonize with the surrounding environment in which the decorative-sheet-including display device 1 is installed. The design that is produced by the design layer 30 is preferably displayed by using multiple colors.

The visible light transmittance of the design layer 30 is decreased to display the design thickly and clearly. Specifically, the visible light transmittance of the design layer 30 is 20%, or less, preferably 10% or less, more preferably 5% or less.

The design layer 30 includes a pictorial pattern layer 31 that forms a pictorial pattern and an inorganic layer 32 that contains inorganic material 32b. In the example illustrated in FIG. 2, the pictorial pattern layer 31 is nearer than the inorganic layer 32 to the base material film 21. In particular, the pictorial pattern layer 31 is disposed so as to be in contact with the base material film 21. In the example illustrated in FIG. 3, the inorganic layer 32 is nearer than the pictorial pattern layer 31 to the base material film 21.

The pictorial pattern layer 31 forms a pictorial pattern as the design that is produced by the design layer 30. When the thickness of the pictorial pattern layer 31 is sufficiently large, the pictorial pattern that is formed by the pictorial pattern layer 31 can be thick and clear. The thickness of the pictorial pattern layer 31 described herein means the length of the pictorial pattern layer 31 in the direction of the normal to the base material film 21 that supports the design layer 30. In a specific example, the thickness of the pictorial pattern layer 31 is preferably no less than 1 µm and no more than 20 µm.

The color of the inorganic layer 32 does not degrade the design properties of the pictorial pattern that is formed by the pictorial pattern layer 31 by being mixed with the color of the pictorial pattern layer 31 when being observed by an observer from the outside, and preferred examples thereof include white and silver that are unlikely to be mixed. The inorganic material 32b that is contained in the inorganic layer 32 preferably contains aluminum, titanium oxide, or mica such that the color of the inorganic layer 32 is white or silver. In this case, the inorganic material 32b is a flake material the maximum length of which is 5 µm or more. The thickness of the inorganic layer 32 is, for example, no less than 0.5 µm and no more than 10 µm.

Figure 4:
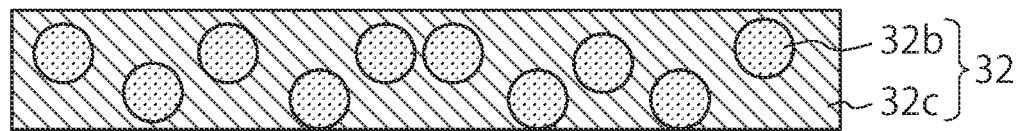
FIG. 4 is a schematic sectional view of the structure of an inorganic layer.

As illustrated in FIG. 4, the inorganic layer 32 contains the inorganic material 32b and binder resin 32c. The inorganic layer 32 is formed with the inorganic material 32b that is particulate contained in the binder resin 32c.

The light-shielding layer 27 is disposed so as to cover the design layer 30 from a side at which the light-shielding layer 27 faces the display device 10. In the example illustrated in FIG. 2, the light-shielding layer 27 is disposed from a position farthest from the base material film 21 and covers the design layer 30 at a position opposite the base material film 21. In the example illustrated in FIG. 3, the light-shielding layer 27 is disposed so as to be in contact with the base material film 21 and covers the design layer 30 from a side of the base material film 21.

The light-shielding layer 27 has a function of absorbing the image light corresponding to the visible light such that the image light corresponding to visible light from the display device 10 is prevented from entering the design layer 30. For example, the light-shielding layer 27 can contain light absorption particles in the binder resin. Examples of the light absorption particles include black pigments such as carbon black and titanium black. The light-shielding layer 27 is preferably disposed only at a position at which the light-shielding layer 27 faces the design layer 30 such that the light-shielding layer 27 does not prevent the image light that is emitted from the display surface 11 of the display device 10 from passing through the transparent portions 29. The design that is produced by the design layer 30 can be thick and clear with the light-shielding layer 27 that has sufficient thickness covering the design layer 30. In a specific example, the thickness of the light-shielding layer 27 is no less than 1 µm and no more than 20 µm.

The light-shielding layer 27 can absorb the laser light at a high absorption coefficient. For this reason, a light-shielding film 27a that is to form the light-shielding layer 27 in a process of manufacturing the decorative sheet 20 can absorb the laser light at a high absorption coefficient as described later. In particular, the light-shielding layer 27 may be more likely to absorb the laser light than the design layer 30. In other words, the absorption coefficient of the laser light in the light-shielding layer 27 may be higher than the absorption coefficient of the laser light in the design layer 30. Specifically, the absorption coefficient of the laser light in the light-shielding layer 27 is 3% or more, preferably 5% or more. The laser light described herein is light at a freely selected wavelength that is used to form the transparent portions 29 and an example thereof is light at a wavelength of 1064 nm, 532 nm, or 355 nm. Such a wavelength is the wavelength of laser light that is radiated from a laser light source that is typically available at a low cost and that has a sufficient output and corresponds to the wavelength of the laser light that is used in the process of manufacturing the decorative sheet 20. The absorption coefficient of the laser light can be identified by using, for example, an ultraviolet visible near infrared spectrophotometer (for example, "V-770" made by JASCO Corporation).

Figure 5:
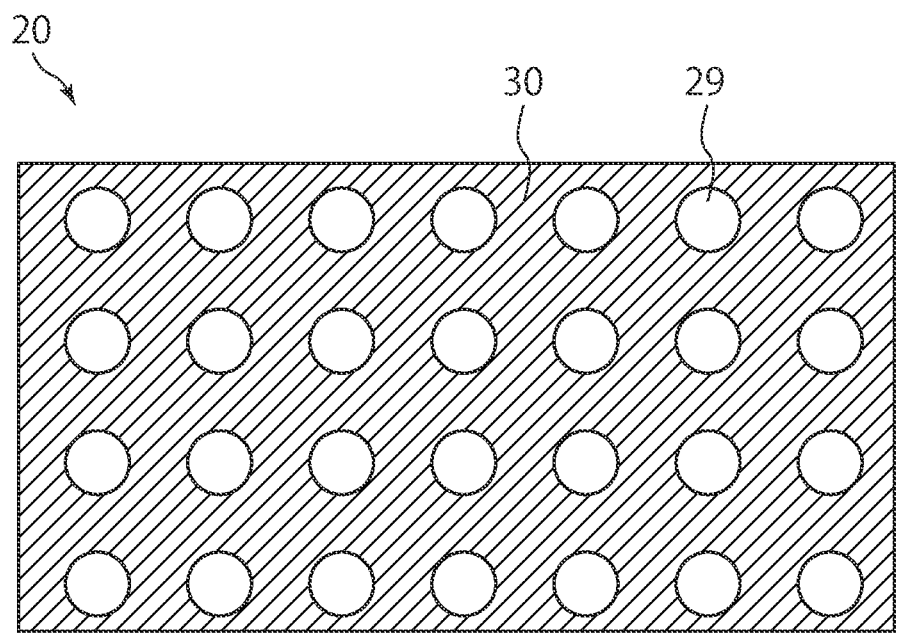
FIG. 5 is an enlarged front view of a part of the decorative-sheet-including display device.

The transparent portions 29 are formed to allow the image light from the display device 10 to pass therethrough. As illustrated in FIG. 2, FIG. 3, and FIG. 5, at the transparent portions 29, neither the design layer 30 nor the light-shielding layer 27 is formed when being observed in front of the decorative sheet 20. The areas of the transparent portions 29 in the decorative sheet 20 are preferably 10% or more such that the image light from the display device 10 sufficiently passes therethrough.

In an example illustrated in FIG. 5, the transparent portions 29 are separated from each other and are regularly arranged in a two-dimensional array. The two-dimensional array means not only that the transparent portions 29 are aligned in a direction but also that the transparent portions 29 are arranged at positions away from the alignment in the direction. The design layer 30 extends between the transparent portions 29. In the illustrated example, the transparent portions 29 are circular in a front view and the transparent portions 29 are arranged in the form of a square lattice. In the case where the transparent portions 29 are circular, the image light that passes through the transparent portions 29 can be inhibited from diffusing. In the case where the transparent portions 29 are arranged in the form of a lattice, particularly, in the form of a square lattice, the image light from the display device 10 can uniformly pass therethrough, and accordingly, the image light is unlikely to be non-uniform. However, the transparent portions 29 are not limited to the illustrated example but may have a freely selected shape such as a rectangular or may be arranged at freely selected positions. For example, the transparent portions 29 may linearly extend from an end portion of the decorative sheet 20 to another end portion. The diameter of the largest incircle of each transparent portion 29 is, for example, no less than 30 μm and no more than 150 μm. In the illustrated example, the transparent portions 29 are circular, and the diameter of each transparent portion 29 is, for example, no less than 30 μm and no more than 150 μm.

The transparent portions 29 may be holes as in the examples illustrated in FIG. 2 and FIG. 3 or may be formed, for example, by filling holes with transparent resin. The transparent resin may be applied not only for the transparent portions 29 but also so as to cover the design layer 30 and the light-shielding layer 27 from a side opposite the base material film 21. The transparent resin enables the transparent portions 29 to be formed and can function as a transparent protective film that protects the design layer 30 and the light-shielding layer 27. In particular, in the case where the design layer 30 is disposed on the light-shielding layer 27 opposite the base material film as illustrated in FIG. 3 and FIG. 3A, the design layer 30 and the transparent portions 29 correspond to parts of the decorative sheet 20 that face outward from the decorative-sheet-including display device 1. For this reason, the design layer 30 and the transparent portions 29 are preferably protected by a protective film 40.

As illustrated in FIG. 2 and FIG. 3, a sectional shape of the light-shielding layer 27 and sectional shapes of the pictorial pattern layer 31 and the inorganic layer 32 of the design layer 30 in a section of the decorative sheet 20 in a direction perpendicular to the sheet surface are trapezoidal shapes the long sides of which face the base material film 21. In other words, the transparent portions 29 at which neither the design layer 30 nor the light-shielding layer 27 is formed are formed so as to be gradually enlarged as a distance from the base material film 21 increases. In other words, the lengths of the transparent portions 29 along the film surface of the base material film 21 increase as the distance from the base material film 21 increases.

The actions of the decorative-sheet-including display device 1 according to the present embodiment will now be described.

Figure 6:
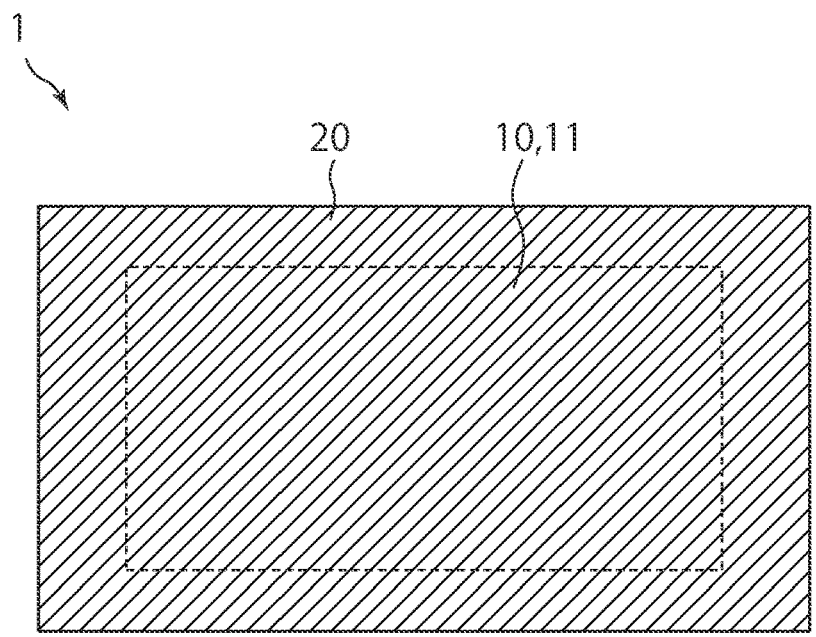
FIG. 6 is a front view of the decorative-sheet-including display device with the display device displaying no image.

As illustrated in FIG. 6, the design that is produced by the design layer 30 of the decorative sheet 20 is displayed with no image displayed on the display surface 11 of the display device 10. That is, the decorative-sheet-including display device 1 can display the design to be observed. Because of the displayed design, the display surface 11 of the display device 10 is not observed by the observer from the outside, and as for the design properties, the decorative-sheet-including display device 1 can harmonize with the surrounding environment.

Figure 7:
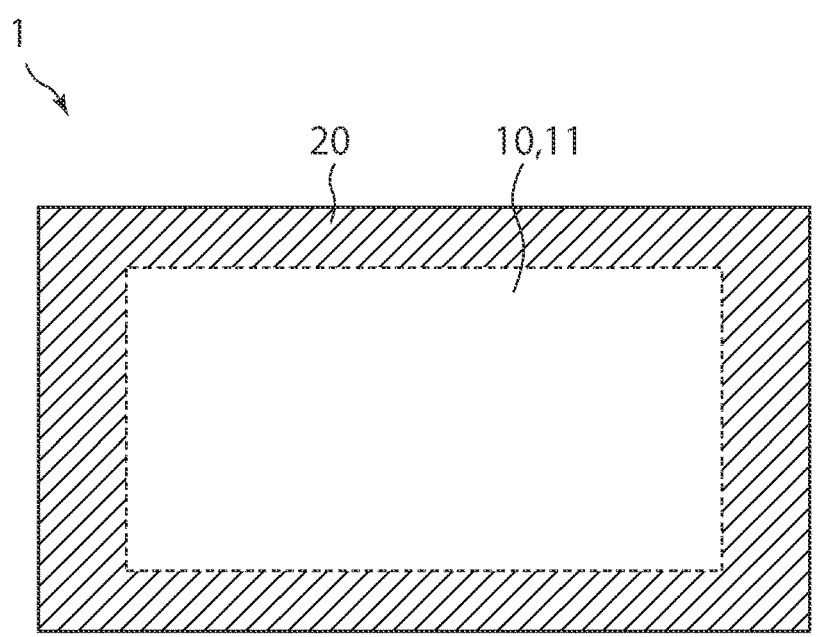
FIG. 7 is a front view of the decorative-sheet-including display device with the display device displaying an image.

As illustrated in FIG. 7, the image light passes through the base material film 21 and the transparent portions 29 of the decorative sheet 20 with the display device 10 displaying an image on the display surface 11. Consequently, the observer can observe the image. That is, the decorative-sheet-including display device 1 can display the image to be observed, and the observer can observe the image from the outside.

The design layer 30 is covered by the light-shielding layer 27 from a side at which the light-shielding layer 27 faces the display device 10. Accordingly, the light-shielding layer 27 blocks the image light that is to enter the design layer 30. For this reason, the image light passes through the design layer 30, and the design that is displayed by the design layer 30 and the image light can be prevented from being mixed and observed. That is, degradation of image color reproductively as a result of the design layer 30 absorbing visible light in a specific wavelength band can be effectively prevented from occurring. In the case where the light-shielding layer 27 extends only in a region in which the light-shielding layer 27 faces the design layer 30, the image light that passes through the transparent portions 29 is prevented from being blocked by the light-shielding layer 27. That is, the image light is effectively used, and a bright image can be displayed.

An example of a method of manufacturing the decorative sheet 20 will now be described with reference to FIG. 3 and FIG. 9.

A design film 30a that is to form the design layer 30 and the light-shielding film 27a that is to form the light-shielding layer 27 are first stacked on one side of the base material film 21. In an example illustrated in FIG. 3, the design film 30a is stacked so as to be in contact with one side of the base material film 21. For this reason, the light-shielding film 27a is stacked on the design film 30a opposite the base material film 21. The design film 30a includes an inorganic film 32a that is to form the inorganic layer 32 on the light-shielding film 27a and includes a pictorial pattern film 31a that is to form the pictorial pattern layer 31 opposite the light-shielding film 27a. The inorganic film 32a contains a flake inorganic material. The maximum length of the inorganic material is 5 μm or more. The inorganic material contains aluminum, titanium oxide, or mica. The pictorial pattern film 31a, the inorganic film 32a, and the light-shielding film 27a are formed by, for example, printing.

The visible light transmittance of the design film 30a is low such that the design that is displayed by the design layer 30 formed is thickly and clearly displayed. Specifically, the visible light transmittance of the design film 30a is 20% or less, preferably 10% or less, more preferably 5% or less.

Figure 9:
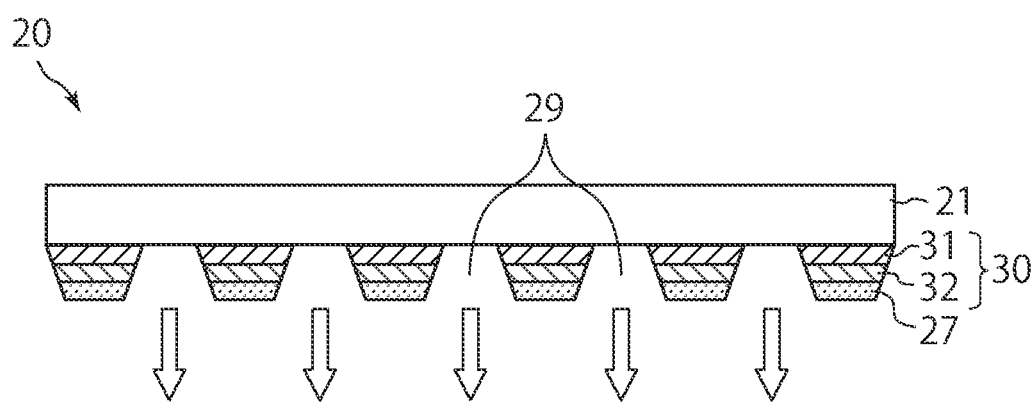
FIG. 9 illustrates a diagram for description of the example of the method of manufacturing the decorative sheet.

Laser light L1 is radiated to positions at which the transparent portions 29 are to be formed as illustrated in FIG. 9. That is, the laser light L1 is regularly radiated to two-dimensional positions. Consequently, the transparent portions 29 are regularly formed in the form of a two-dimensional array. The laser light L1 is radiated from a side of the base material film 21. The laser light L1 can be light at a freely selected wavelength. A specific example of the laser light L1 can be laser light of a Nd:YAG laser at a wavelength of 1064 nm. The formed transparent portions 29 are fine, and accordingly, the output of the laser light L1 is low and is, for example, 70 W or less. Each transparent portion 29 is formed such that the diameter of the largest incircle is no less than 30 μm and no more than 150 μm. The laser light L1 is preferably radiated with one side of the base material film 21 facing downward in the vertical direction. In other words, the laser light L1 is radiated with an angle between the direction of the normal to a film surface corresponding to one side of the base material film 21 and the vertical downward direction being less than 90°.

The radiated laser light L1 can be absorbed by the light-shielding film 27a and the design film 30a. The laser light L1 is sufficiently absorbed by the light-shielding film 27a and the design film 30a, and consequently, the light-shielding film 27a and the design film 30a are removed at the positions at which the laser light L1 is radiated as illustrated in FIG. 9.

Parts of the light-shielding film 27a and the design film 30a to which the laser light L1 is radiated are removed, and consequently, the transparent portions 29 are formed. In other words, cavities that are traces of removal of the light-shielding film 27a and the design film 30a correspond to the transparent portions 29. The design film 30a that is not irradiated with the laser light L1 and that is not removed, that is, the design film 30a that is partly removed forms the design layer 30 that displays the design. Similarly, the light-shielding film 27a that is not irradiated with the laser light L1 and that is not removed, that is, the light-shielding film 27a that is partly removed forms the light-shielding layer 27 that covers the design layer 30. The pictorial pattern film 31a of the design film 30a becomes the pictorial pattern layer 31, and the inorganic film 32a becomes the inorganic layer 32.

When the light-shielding film 27a and the design film 30a are vaporized, the light-shielding film 27a and the design film 30a that are vaporized can involve the light-shielding film 27a and the design film 30a so as to expand toward the vicinity of the vaporized light-shielding film 27a and design film 30a. In this case, the transparent portions 29 that are traces of removal of the parts of the light-shielding film 27a and the design film 30a can be formed so as to be gradually enlarged as the distance from the base material film 21 increases.

Through the processes described above, the decorative sheet 20 illustrated in FIG. 2 is manufactured.

Another example of the method of manufacturing the decorative sheet 20 will now be described with reference to FIG. 10 and FIG. 11.

The design film 30a that is to form the design layer 30 and the light-shielding film 27a that is to form the light-shielding layer 27 are stacked on one side of the base material film 21 as in the example of the method of manufacturing the decorative sheet 20. In an example illustrated in FIG. 10, the light-shielding film 27a is stacked so as to be in contact with one side of the base material film 21. For this reason, the design film 30a is stacked on the light-shielding film 27a opposite the base material film 21. The design film 30a includes the inorganic film 32a that is to form the inorganic layer 32 on the light-shielding film 27a and the pictorial pattern film 31a that is to form the pictorial pattern layer 31 opposite the light-shielding film 27a. The inorganic film 32a contains the flake inorganic material. The maximum length of the inorganic material is 5 μm or more. The inorganic material contains aluminum, titanium oxide, or mica. The pictorial pattern film 31a, the inorganic film 32a, and the light-shielding film 27a are formed by, for example, printing.

The visible light transmittance of the design film 30a is low such that the design that is displayed by the design layer 30 formed is thickly and clearly displayed. Specifically, the visible light transmittance of the design film 30a is 20% or less, preferably 10% or less, more preferably 5% or less.

Figure 11:
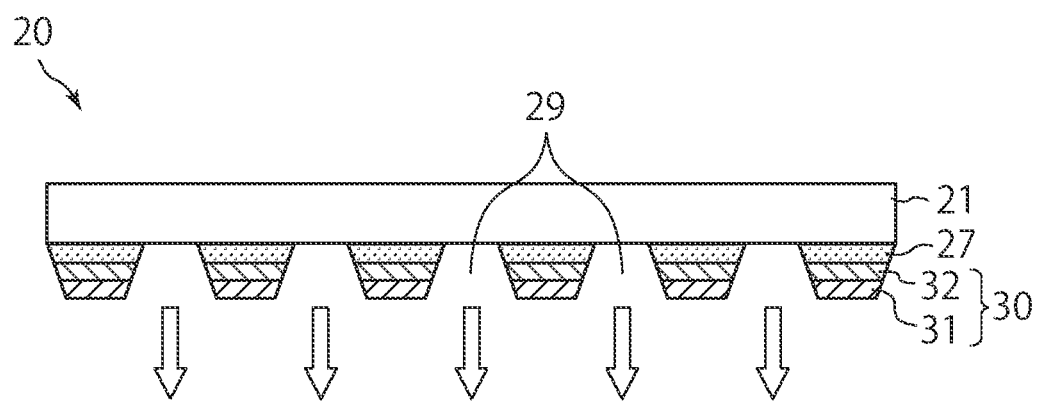
FIG. 11 illustrates a diagram for description of another example of the method of manufacturing the decorative sheet.

Subsequently, as illustrated in FIG. 11, the laser light L1 is radiated to the positions at which the transparent portions 29 are to be formed. That is, the laser light L1 is regularly radiated to the two-dimensional positions. Consequently, the transparent portions 29 are regularly formed in the form of a two-dimensional array. The laser light L1 is radiated from a side of the base material film 21. The laser light L1 can be light at a freely selected wavelength. A specific example of the laser light L1 can be the laser light of the Nd:YAG laser at a wavelength of 1064 nm. The formed transparent portions 29 are fine, and accordingly, the output of the laser light L1 is low and is, for example, 70 W or less. Each transparent portion 29 is formed such that the diameter of the largest incircle is no less than 30 μm and no more than 150 μm. The laser light L1 is preferably radiated with one side of the base material film 21 facing downward in the vertical direction. In other words, the laser light L1 is radiated with the angle between the direction of the normal to the film surface corresponding to one side of the base material film 21 and the vertical downward direction being less than 90°.

The radiated laser light L1 can be absorbed by the light-shielding film 27a and the design film 30a. The light-shielding film 27a can absorb the laser light L1 at a high absorption coefficient. The absorption coefficient of the laser light L1 in the light-shielding film 27a is higher than the absorption coefficient of the laser light L1 in the design film 30a and is, for example, 3% or more, preferably 50% or more, more preferably 80% or more. The laser light L1 is radiated from the positions on the base material film 21. For this reason, the light-shielding film 27a can sufficiently absorb the laser light L1 unlike the design film 30a. The light-shielding film 27a preferably uniformly absorbs the laser light L1 therein. For example, the absorption coefficient of the laser light L1 in the light-shielding film 27a can be uniform in the light-shielding film in a manner in which the light-shielding film 27a is uniformly formed by using the same material. In this case, the light-shielding film 27a can uniformly absorb the laser light L1 therein. The laser light L1 is radiated from a side nearer than the design film 30a to the light-shielding film 27a, and accordingly, the light-shielding film 27a can uniformly absorb the laser light L1 therein, and this does not depend on a variation in the absorption coefficient of the laser light in the design film 30a.

The laser light L1 is absorbed by the light-shielding film 27a and the design film 30a, and consequently, the light-shielding film 27a and the design film 30a are removed at the positions at which the laser light L1 is radiated as illustrated in FIG. 11. In particular, when the laser light L1 is sufficiently absorbed by the light-shielding film 27a in contact with one side of the base material film 21, the light-shielding film 27a is vaporized. When the light-shielding film 27a is vaporized, the design film 30a is involved at positions at which the design film 30a overlaps the light-shielding film 27a that absorbs the laser light L1, and the design film 30a is removed together with the light-shielding film 27a at the positions at which the laser light L1 is radiated.

Parts of the light-shielding film 27a and the design film 30a that are irradiated with the laser light L1 are removed, and consequently, the transparent portions 29 are formed. In other words, cavities that are traces of removal of the light-shielding film 27a and the design film 30a correspond to the transparent portions 29. The design film 30a that is not irradiated with the laser light L1 and that is not removed, that is, the design film 30a that is partly removed forms the design layer 30 that displays the design. Similarly, the light-shielding film 27a that is not irradiated with the laser light LA and that is not removed, that is, the light-shielding film 27a that is partly removed forms the light-shielding layer 27 that covers the design layer 30. The pictorial pattern film 31a of the design film 30a becomes the pictorial pattern layer 31, and the inorganic film 32a becomes the inorganic layer 32.

In particular, in the case where the light-shielding film 27a sufficiently absorbs the laser light L1, and the design film 30a scarcely absorbs the laser light L1, the transparent portions 29 that are formed by removing the light-shielding film 27a and the design film 30a can have uniform sizes.

When the light-shielding film 27a is vaporized, the light-shielding film 27a that is vaporized can involve the design film 30a so as to expand not only in the direction in which the design film 30a is stacked on the light-shielding film 27a but also toward the vicinity of the vaporized light-shielding film 27a. In this case, the transparent portions 29 that are the traces of removal of the parts of the light-shielding film 27a and the design film 30a can be formed so as to be gradually enlarged as the distance from the base material film 21 increases.

Through the processes described above, the decorative sheet 20 illustrated in FIG. 3 is manufactured.

Figure 12:
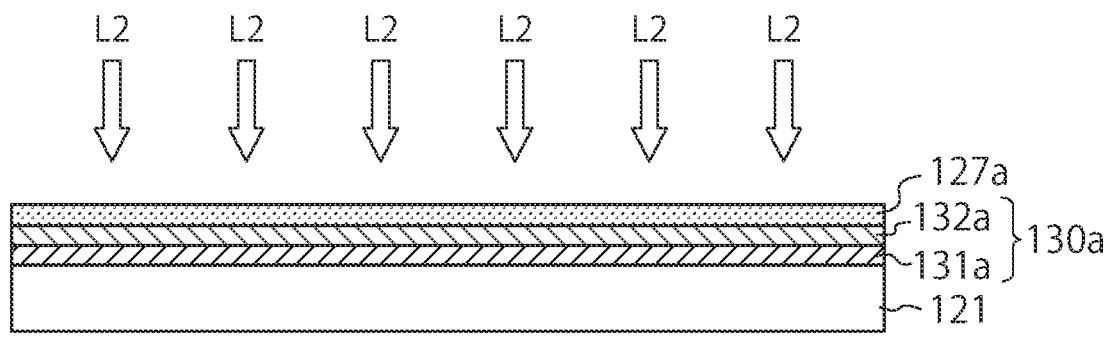
FIG. 12 illustrates a diagram for description of an example of a method of manufacturing an existing decorative sheet.
Figure 13:
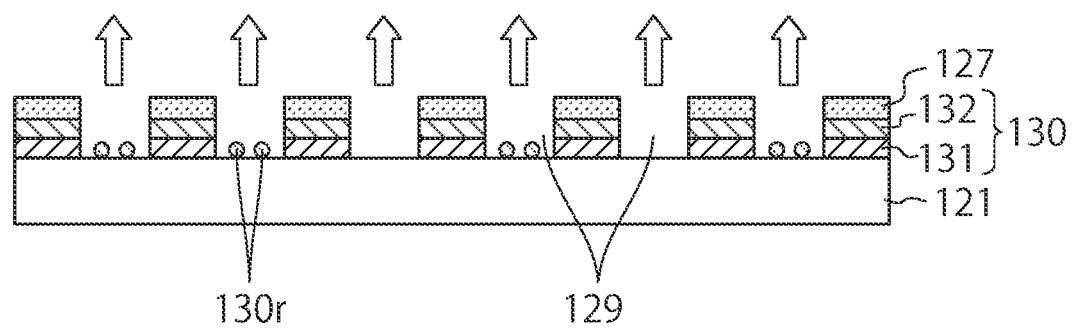
FIG. 13 illustrates a diagram for description of the example of the method of manufacturing the existing decorative sheet.

As illustrated in FIG. 12, an existing decorative sheet 120 is manufactured in a manner in which a pictorial pattern film 131a, an inorganic film 132a, and a light-shielding film 127a are stacked in this order on a base material film 121, and laser light L2 is radiated to positions at which transparent portions 129 are to be formed from a side opposite the base material film 21. When the output of the laser light L2 is high, the pictorial pattern film 131a around the transparent portions 129 to be formed, for example, can be affected by the laser light L2. Consequently, the color of the pictorial pattern film 131a is changed into black, and design that is produced by a design layer 130 formed is degraded. For this reason, the output of the laser light L2 is preferably low. However, in some cases where the transparent portions 129 are formed by using a low output of the laser light L2, as illustrated in FIG. 13, a design film 130a that is to form the design layer 130 is not sufficiently removed, and a residue 130r of the design film 130a remains in one of the transparent portions 129. The design properties can differ between the transparent portion 129 at which the residue 130r remains and the transparent portions 129 at which the residue 130r does not remain. Specifically, in some cases, design is displayed more thickly than the design to be displayed due to the residue 130r. There is a possibility that the design that is displayed by the decorative sheet 120 has a shade pattern due to the difference in the design properties, the design to be displayed by the decorative sheet 120 is degraded, and the design properties that are provided by the decorative sheet 120 are degraded.

As a result of serious consideration, the present inventors have found that the cause of the residue 130r is that a large amount of the laser light L2 is absorbed by the light-shielding film 127a that is disposed on a side to be irradiated with the laser light L2, and the design film 130a that is disposed on the base material film 121 away from a side of irradiation of the laser light 12 does not sufficiently absorb the laser light L2. Specifically, the light-shielding film 127a absorbs a large amount of the laser light L2, and consequently, the laser light L2 does not sufficiently reach parts of the pictorial pattern film 131a and the inorganic film 132a of the design film 130a. Accordingly, the parts of the pictorial pattern film 131a and the inorganic film 132a are not sufficiently vaporized, and parts of the design film 130a remain in the transparent portions 129. In other words, a member that is disposed on a side to be irradiated with the laser light L2 is likely to be vaporized, and a member that is away from a side of irradiation of the laser light L2 is unlikely to be vaporized. Accordingly, a part of the member that is not vaporized can be a residue.

It is thought that a material that absorbs the laser light, for example, an infrared absorbing material such as a cyanine workpiece, a phthalocyanine compound, a dithiol metal complex, lanthanum hexaboride, a cesium-doped tungsten oxide, a naphthoquinone compound, or a diimonium compound is added into the design film 130a such that the design film 130a sufficiently absorbs the laser light L2. However, such a laser light absorbing material and a colorant such as an inorganic pigment for producing the design need to appropriately disperse in the design film 130a, and accordingly, it is difficult to appropriately set the amount of the laser light absorbing material and the colorant that are contained in the design film 130a. In addition, the colorant can cause diffuse reflection of the laser light L2, and accordingly, it is difficult for the laser light absorbing material to sufficiently absorb the laser light L2. For this reason, even in the case where the laser light absorbing material is added into the design film 130a, the laser light absorbing material that absorbs the laser light L2 is inappropriately and insufficiently vaporized, and the residue 130r remains in the transparent portion 129 of the decorative sheet 120.

Figure 8:
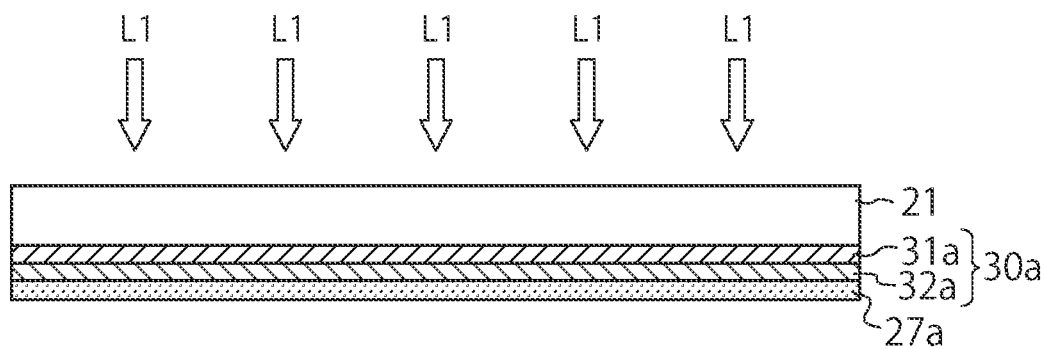
FIG. 8 illustrates a diagram for description of an example of a method of manufacturing a decorative sheet.
Figure 10:
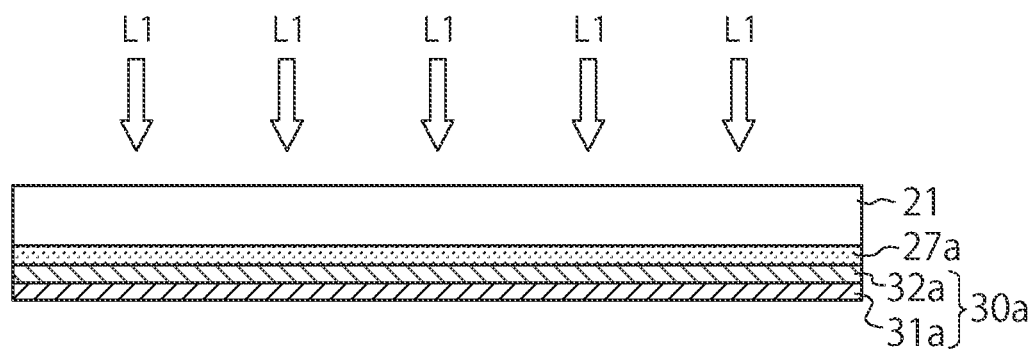
FIG. 10 illustrates a diagram for description of another example of the method of manufacturing a decorative sheet.

As illustrated in FIG. 8 and FIG. 10, the decorative sheet 20 according to the present embodiment is manufactured by radiating the laser light L1 from a side on the base material film 21. A large amount of the laser light L1 is absorbed by the design film 30a or the light-shielding film 27a that is disposed on one side of the base material film 21 to which the laser light L1 is radiated, and consequently, the design film 30a or the light-shielding film 27a that is disposed on one side of the base material film 21 can be vaporized. When the design film 30a or the light-shielding film 27a that is disposed on one side of the base material film 21 to which the laser light L1 is radiated is vaporized, the design film 30a or the light-shielding film 27a that is disposed away from a side of irradiation of the laser light L1 is involved and removed together with the design film 30a or the light-shielding film 27a that is disposed on one side of the base material film 21 to which the laser light L1 is radiated. The design film 30a or the light-shielding film 27a that is disposed on one side of the base material film 21 to which the laser light L1 is radiated can sufficiently absorb the laser light L1. The light-shielding film 27a and the design film 30a that sufficiently absorb the laser light L1 is easily vaporized. For this reason, the design film 30a and the light-shielding film 27a that are stacked can be removed, and the residue scarcely remains. That is, the residue can be unlikely to remain in the transparent portions 29 of the decorative sheet 20.

Even in the case where another member other than the design film 30a and the light-shielding film 27a is disposed on one side of the base material film 21, when the member absorbs the laser light L1 and is vaporized, the design film 30a and the light-shielding film 27a are involved and can be removed. Accordingly, the residue can be unlikely to remain in the transparent portions 29 of the decorative sheet 20.

The laser light L1 is radiated from a side on the base material film 21, and accordingly, the vaporized light-shielding film 27a and design film 30a are unlikely to move toward a radiation device that radiates the laser light 1. That is, the vaporized light-shielding film 27a and design film 30a are inhibited from adhering to the radiation device for the laser light L1, and the radiation device is inhibited from being contaminated.

In particular, in the example illustrated in FIG. 10, the light-shielding film 27a is stacked so as to be in contact with a surface of the base material film 21. The light-shielding film 27a can absorb the laser light L1 at a high absorption coefficient. Specifically, the absorption coefficient of the laser light L1 in the light-shielding film 27a is 3% or more, preferably 50% or more, more preferably 80% or more. For this reason, the light-shielding film 27a absorbs the laser light L1 at a high absorption coefficient by being irradiated with the laser light L1, and the light-shielding film 27a can be easily vaporized. For this reason, the design film 30a that is stacked on the light-shielding film 27a is involved with the light-shielding film 27a and is removed together with the light-shielding film 27a. Accordingly, the design film 30a and the light-shielding film 27a that are stacked can be removed, and the residue scarcely remains. That is, the residue can be unlikely to remain in the transparent portions 29 of the decorative sheet 20.

The prevent inventors have confirmed that when the absorption coefficient of the laser light L1 in the light-shielding film 27a is 3% or more, the residue in the transparent portions 29 of the decorative sheet 20 that is manufactured has little influence on the design properties of the design that is displayed. When the absorption coefficient of the laser light L1 in the light-shielding film 27a is 10% or more, the residue is scarcely observed in the decorative sheet 20 that is manufactured.

The absorption coefficient of the laser light L1 in the light-shielding film 27a is higher than the absorption coefficient of the laser light L1 in the design film 30a. In other words, the light-shielding film 27a can absorb the laser light more efficiently than the design film 30a. The laser light is efficiently absorbed, and consequently, the light-shielding film 27a is likely to be vaporized. When the light-shielding film 27a is vaporized, the design film 30a that is stacked on the light-shielding film 27a is involved, consequently, the design film 30a can be removed, and the residue scarcely remains. That is, the residue can be unlikely to remain in the transparent portions 29 of the decorative sheet 20.

The light-shielding film 27a is a uniform film composed of the same material. Accordingly, the absorption coefficient of the laser light L1 in the light-shielding film 27a is uniform in the light-shielding film. For this reason, the light-shielding film 27a can uniformly absorb the laser light L1 at the positions at which the laser light L1 is radiated. The light-shielding film 27a that absorbs the laser light L1 is uniformly vaporized. Accordingly, the transparent portions 29 that are traces of vaporization of the light-shielding film 27a can be easily formed into the same shape.

The design film 30a includes the inorganic film 32a that contains the inorganic material 32b and the binder resin 32c. The maximum length of the inorganic material is 5 μm or more. If both of the inorganic material 32b and the binder resin 32c that are typical do not sufficiently absorb the laser light in the inorganic film 32a, the residue is likely to remain in the transparent portions 29. In particular, the inorganic material 32b contains aluminum, titanium oxide, or mica. In the case where such a material is contained, the visible light absorption coefficient of the inorganic layer 32 can be 3% or less. As for the inorganic layer 32, the inorganic material 32b and the binder resin 32c are unlikely to absorb the laser light, and accordingly, the residue is likely to remain. According to the present embodiment, however, the laser light L1 is radiated from a side on the base material film 21, and consequently, the laser light L1 is sufficiently absorbed for vaporization in the case where the design film 30a is stacked on one side of the base material film 21. In the case where the design film 30a is stacked on the light-shielding film 27a opposite the base material film 21, when the light-shielding film 27a that absorbs the laser light L1 is vaporized, the design film 30a is involved and removed together with the light-shielding film 27a. In any case, the design film 30a can be removed, and the residue scarcely remains. That is, the residue can be unlikely to remain in the transparent portions 29 of the decorative sheet 20.

The laser light L1 is radiated with the angle between the direction of the normal to the film surface corresponding to one side of the base material film 21 and the vertical downward direction being less than 90°. That is, the laser light L1 is radiated with the film surface of the base material film 21 on which the light-shielding film 27a and the design film 30a are stacked facing in the vertical downward direction. When the laser light L1 is radiated, and the transparent portions 29 are formed, the residue that is likely to remain in the transparent portions 29 can be dropped by gravity to a location outside the decorative sheet 20. For this reason, the residue can be unlikely to remain in the transparent portions 29 in the process of manufacturing the decorative sheet 20.

In the decorative sheet 20, the length of each transparent portion 29 along the film surface of the base material film 21 increases as the distance from the base material film 21 increases. That is, the light-shielding layer 27 and the design layer 30 are gradually enlarged as distances from the base material film 21 decrease. The light-shielding layer 27 and the design layer 30 that have such shapes are unlikely to be separated from the base material film 21. Even when pressure is applied to the decorative sheet 20, the light-shielding layer 27 and the design layer 30 are unlikely to deform. That is, the light-shielding layer 27 and the design layer 30 are stable. For this reason, the design that is produced by the design layer 30 is unlikely to be degraded.

The light-shielding layer 27 is disposed on the design layer 30 opposite the base material film 21. In this case, as illustrated in FIG. 2, the design layer 30 is larger than the light-shielding layer 27. Accordingly, the light-shielding layer 27 is effectively inhibited from being observed during observation from the design layer 30. That is, the image light that passes through the transparent portions 29 is effectively prevented from being blocked by the light-shielding layer 27.

Alternatively, the design layer 30 is disposed on the light-shielding layer 27 opposite the base material film 21. In this case, as illustrated in FIG. 3, the light-shielding layer 27 is larger than the design layer 30. Accordingly, the light-shielding layer 27 effectively shields light that is to enter the design layer 30. That is, the image light, for example, is effectively prevented from passing through the design layer 30, and the design that is displayed by the design layer 30 and light such as the image light are effectively prevented from being mixed and observed.

The decorative sheet 20 according to the present embodiment is thus manufactured by a method that includes a step of stacking the light-shielding film 27a and the design film 30a on one side of the base material film 21 and a step of removing a part of the light-shielding film 27a and a part of the design film 30a by radiating the laser light. L1 from a side of the base material film 21 and forming the transparent portions 29 such that the design film 30a the part of which is removed forms the design layer 30 that displays the design, and the light-shielding film 27a the part of which is removed forms the light-shielding layer 27 that covers the design layer 30. As for the decorative sheet 20 that is manufactured by the manufacturing method, the design film 30a or the light-shielding film 27a that is disposed on a side of the base material film 21 to which the laser light L1 is radiated sufficiently absorbs the laser light L1, and accordingly, the design film 30a and the light-shielding film 27a that are stacked can be removed, and the residue scarcely remains. For this reason, the residue can be unlikely to remain in the transparent portions 29 of the decorative sheet 20, and the design properties of the decorative sheet 20 can be inhibited from being degraded.

The decorative sheet 20 and the decorative-sheet-including display device 1 that includes the decorative sheet 20 described above are used for an exterior member or an interior member of a movable body, for example, a vehicle such as an automobile or a railway vehicle, an aircraft, a ship, or a spaceship. In a specific example, the decorative sheet 20 and the decorative-sheet-including display device 1 that includes the decorative sheet 20 are used for a center console or a door trim of an automobile. The decorative sheet 20 and the decorative-sheet-including display device 1 that includes the decorative sheet 20 may be used by being incorporated into an exterior member or an interior member of a building, an electronic device, furniture, or an electronic product.

An aspect of the present invention is not limited by the embodiment described above and includes various modifications that can be thought by a person skilled in the art, and the effects of the present invention are not limited to the contents described above. That is, various additions, modifications, and partial removal can be made without departing from the conceptual idea and spirit of the present invention derived from the contents recited in claims and the equivalent thereof.

For example, according to the embodiment described above, the pictorial pattern layer 31 is nearer than the inorganic layer 32 to the base material film 21 in the design layer 30. That is, the pictorial pattern film 31a is disposed on the base material film 21 in the process of manufacturing the decorative sheet 20, and the inorganic film 32a is disposed on the light-shielding film 27a. However, the inorganic film 32a may be disposed on the base material film 21, and the pictorial pattern film 31a may be disposed on the light-shielding film 27a.

The design layer 30 may include multiple pictorial pattern layers 31 and multiple inorganic layers 32. The design layer 30 may not include the pictorial pattern layer 31. That is, the design film 30a may include multiple pictorial pattern films 31a and multiple inorganic films 32a or may not include the pictorial pattern film 31a. In the case where the design layer 30 does not include the pictorial pattern layer 31, the design that is displayed by the design layer 30 is produced by the inorganic layer 32.

REFERENCE SIGNS LIST 1 decorative-sheet-including display device
10 display device
11 display surface
20 decorative sheet
21 base material film
27 light-shielding layer
27a light-shielding film
29 transparent portion
30 design layer
30a design film
31 pictorial pattern layer
31a pictorial pattern film
32 inorganic layer
32a inorganic film
40 protective film

The invention claimed is:

1. A decorative sheet comprising:
a base material film;
a light-shielding layer and a design layer that are disposed on one side of the base material film; and
a plurality of transparent portions at which neither the light-shielding layer nor the design layer is formed, wherein
a length of the transparent portion along a film surface of the base material film increases as a distance from the base material film increases,
each of the plurality of transparent portions are circular in a front view, and
the plurality of transparent portions are arranged in the form of a lattice.

2. The decorative sheet according to claim 1, wherein the design layer is disposed on the light-shielding layer opposite the base material film.

3. The decorative sheet according to claim 1, wherein the light-shielding layer is disposed to be in contact with the base material film.

* * * * *